June 17, 1952
L. J. BOWLER
2,600,467
EGG WASHING AND SCRUBBING APPARATUS
Filed July 2, 1948
2 SHEETS—SHEET 1
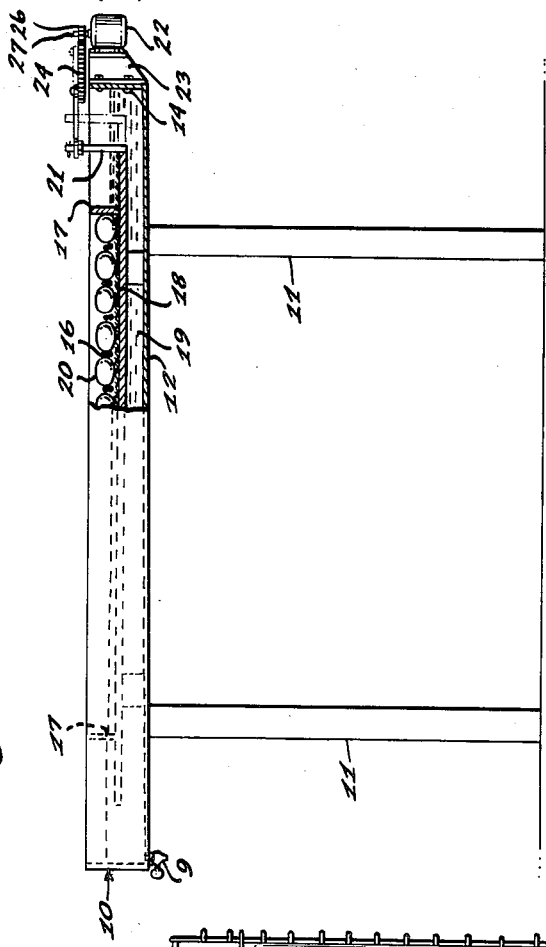
INVENTOR.
LOUIS J. BOWLER
BY
McMorrow, Berman & Davidson
ATTORNEYS June 17, 1952 — L. J. BOWLER — 2,600,467
EGG WASHING AND SCRUBBING APPARATUS
Filed July 2, 1948 — 2 SHEETS—SHEET 2
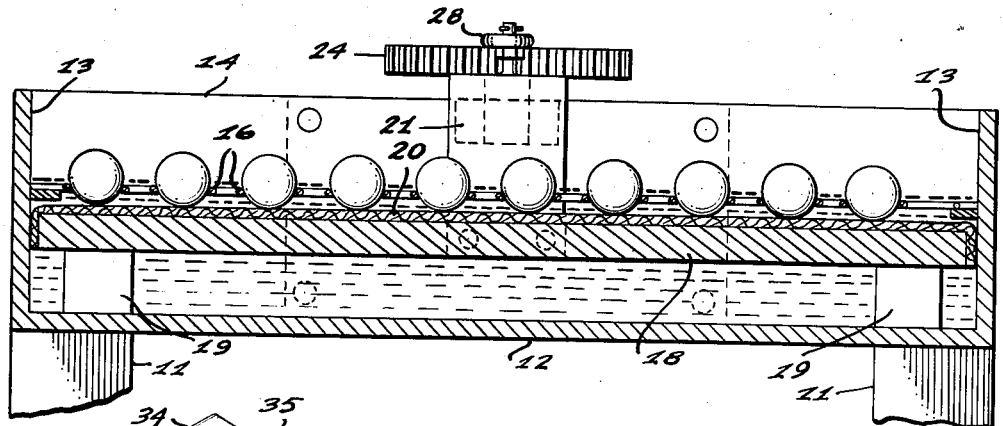
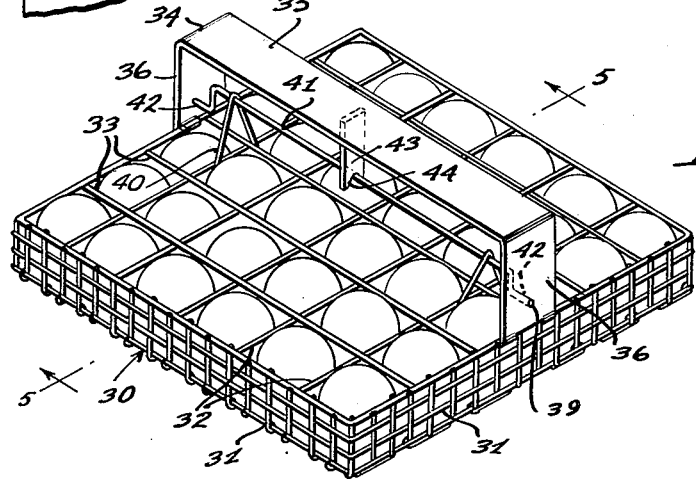
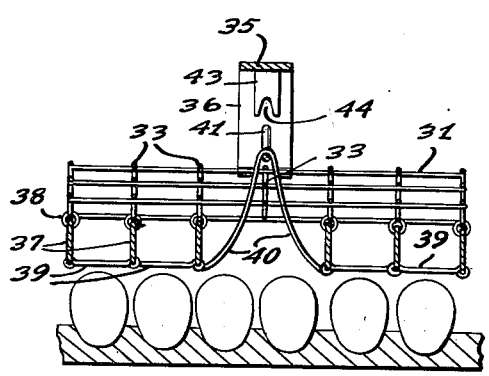
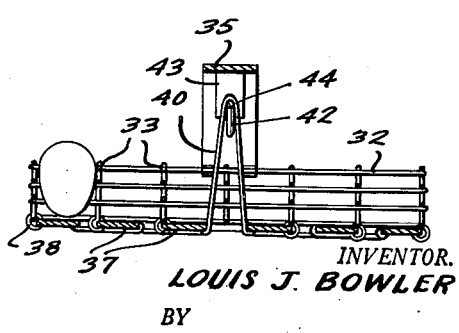
INVENTOR.
LOUIS J. BOWLER
BY
McMorrow, Berman & Davidson
ATTORNEYS Patented June 17, 1952

2,600,467

UNITED STATES PATENT OFFICE 2,600,467

EGG WASHING AND SCRUBBING APPARATUS

Louis J. Bowler, Middletown, Calif.

Application July 2, 1948, Serial No. 36,793

2 Claims. (Cl. 15—3.12)

This invention relates to improvements in egg washing and scrubbing apparatus and more particularly to improved apparatus usable by a single operator for washing eggs and depositing the washed eggs in conventional egg crates.

It is among the objects of the invention to provide improved egg washing and scrubbing apparatus of simple construction, which will effectively and continuously wash eggs as they are deposited therein without breaking or cracking any of the eggs, which will receive the washed eggs and deposit them, an entire layer at a time, in a conventional egg crate, which can be easily operated by a single operator, does not require a high degree of skill or proficiency for its efficient operation, and is simple and durable in construction and economical to manufacture.

Other objects and advantages will become apparent from a consideration of the following description and the appended claims in conjunction with the accompanying drawings wherein:

Figure 1 is a side elevation of an egg washing apparatus illustrative of the invention, a portion being broken away and shown in cross section to better illustrate the construction thereof.

Figure 2 is a top plan view of the egg washing apparatus illustrated in Figure 1.

Figure 3 is a transverse cross section, on an enlarged scale, of the egg washing apparatus, taken substantially on the line 3—3 of Figure 2.

Figure 4 is a perspective view of an improved egg carrying apparatus or receptacle showing eggs in position therein.

Figure 5 is a transverse cross section of the egg carrying receptacle illustrated in Figure 4, taken substantially on the line 5—5 of Figure 4, and showing the receptacle in closed or egg retaining condition.

Figure 6 is a transverse cross section similar to Figure 5 showing the receptacle in open or egg-releasing position, and Figure 7 is a bottom plan view of the receptacle illustrated in Figure 4.

With continued reference to the drawings, the egg washing apparatus comprises a shallow, elongated, rectangular tank, generally indicated at 10, supported on four legs 11, disposed near the four corners of the tank. The tank has a bottom wall 12 slightly inclined from one end of the tank to a location adjacent the other end, side walls 13 and end walls 14. The upper side of the tank is open except for a platform 15 extending across the top of the tank at the rear end thereof to support egg-receiving receptacles, and a drain valve 9 is provided at the deeper end of the tank.

Egg holding means is secured in the tank and comprises a piece of wire mesh 16 extending transversely and longitudinally of the tank above and substantially parallel to the bottom wall 12. This piece of wire mesh has its longitudinal edges secured one to each side wall 13 of the tank and its end edges secured to respective battens 17 extending transversely of the tank, spaced from the opposite ends thereof and downwardly from the top edges of the tank's side walls to a location spaced above the bottom wall. This wire mesh has openings therein of a size to individually receive eggs to be washed.

Egg scrubbing means is disposed in the tank below the holding means 16 and comprises a flat rectangular plate 18 positioned below the wire mesh holding means 16, a distance to support eggs in the openings of the wire mesh and is substantially parallel to the holding means. Side rails 19 are mounted in the tank, one adjacent each side thereof, to support the plate 18 in operative position below the holding means 16 and the upper surface of the plate is provided with a fabric covering 20 preferably formed of cotton toweling or similar material.

The plate 18 is longitudinally reciprocable in the tank below the holding means 16 to roll and scrub the eggs held in the openings of the holding means.

A post 21 is secured to the front end of plate 18 substantially at the mid-width location thereof and extends upwardly somewhat above the upper edges of the tank side walls. An electric motor 22 is secured to the front end of wall 14 of the tank by a suitable bracket 23 and is positioned so that the shaft is substantially vertical and projects above the upper edges of the tank walls. A large gear 24 is rotatably mounted on a vertically disposed axle 25 carried by bracket 23, and a small gear 26 on the motor shaft 27 meshes with gear 24 to rotate the latter when the motor is energized. An eccentric pin 28 extends upwardly from the gear 24 and a link rod 29 pivotally connects pin 28 with the top end of post 21 to reciprocate the plate 18 longitudinally when gear 24 is rotated by motor 22.

In case electricity for operating the motor 22 is not available, a hand crank can be substituted therefore for rotating the small gear 26 and driving the large gear 24.

Water is put into the tank to a level slightly above the wire mesh holding means 16 and a suitable detergent may be added to the water, if desired. Eggs to be washed are then placed in the openings of the holding means and the motor 22 placed in operation. The reciprocating scrubber 18, operating against the bottom surface of the eggs, will turn the eggs in the openings of the holding means and in doing so effectively remove all foreign matter from the egg shells. The scrubber reciprocates at a slow speed so that the eggs are not roughly handled or cracked or broken during the washing operation. When the eggs have been satisfactorily cleaned they are manually removed from the holding means and placed in a receptacle, particularly illustrated in Figure 4 and generally indicated at 30, supported on the platform 15 at the rear end of the egg washer. When the water in the tank becomes dirty it may be removed through the drain valve 9 and a fresh supply of water provided. The receptacle 30 comprises a rectangular wire basket having side walls 31 and is of a size to closely fit into one end compartment of a conventional egg crate. Transversely extending wires 32 divide the interior of the basket in one direction into a number of rows corresponding to the number of rows of eggs received in an egg crate half. These wire partitions are uniformly spaced apart and parallel to each other and in the illustrated arrangement there are five partitions dividing the interior space of the basket into six rows corresponding to the conventional egg crate size. Wire partition members 33 extend across the interior of the basket perpendicular to the partition members 32 and divide the rows provided by the members 32 into individual egg compartments. The number of partition members 33 is the same as the number of partition members 32 so that the basket or receptacle will hold six rows of six eggs in each row making a total of thirty-six eggs which corresponds to the capacity of the conventional egg crate half. A handle 34 preferably formed of a strip of thin metal, has a straight intermediate portion 35 substantially parallel to the upper edges of the basket walls and perpendicularly extending end portions 36 which are directed downwardly from the intermediate portion and are connected at their lower ends to two opposite side walls of the receptacle at the mid-length location of the latter. The handle may be conveniently secured to the basket portion of the receptacle by having the lower ends of the end portions 36 bent around the top wire of the two opposite side walls of the basket, as is clearly illustrated in Figure 4.

A plurality of narrow plates 37 extend across the bottom of the basket, one under each row, provided by the space dividing partition members 33. There is a respective plate 37 underlying such egg receiving row of the receptacle and each plate is hingedly connected along one edge to the bottom edge of the corresponding partition 33, as indicated at 38, in Figures 5 and 6. The plates 37 extend substantially parallel to the handle 34 and the group of three plates at each side of the handle are movable toward the similar group at the opposite side of the handle when the plates are pivoted to their compartment-closing position, as illustrated in Figure 5. Pivoted links 39 secure the three plates of each group together for simultaneous movement. A pair of wickets 40 of flexible wire is secured to the bottom or inner edges of the two inner plates 37 and extend upwardly over the middle partition 33. These wickets are substantially V-shaped and a crank rod 41 passes through the wickets at the apices thereof and has offset end portions 42 journalled one in each end portion 36 of the handle so that when the crank rod 41 is rotated to a position such that its intermediate portion is at its uppermost position, as is illustrated in Figure 4, the two wickets 40 are pulled upwardly to move the plates 37 to their compartment-closing position in which they constitute the bottom wall of the receptacle, as is clearly illustrated in Figure 7. The crank rod 41 is held in this compartment-closing position by a lug 43 extending downwardly from the intermediate portion of the handle and having in its lower end a notch releasably receiving the intermediate portion of the crank rod. The crank rod is manually releasable from the notch 44 in the lower end of lug 43 and when so released and turned, so that its intermediate portion is in its lowermost position, the plates 37 are swung to the position illustrated in Figure 6 in which the eggs are released from the receptacle into the egg crate.

As explained above, as the eggs are washed they are deposited in a receptacle 30, supported upon the platform 15 of the washing apparatus. As the receptacle 30 is filled with eggs, it is placed in an end compartment of a conventional egg crate and the eggs are released, in a manner explained above, into the crate whereupon the plates 37 of the receptacle are returned to their compartment-closing position and the receptacle again placed upon the platform to receive eggs from the washer.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. Egg washing apparatus comprising a shallow, rectangular tank having an open upper side, egg holding means disposed in and secured to said tank comprising a piece of wire mesh extending from side-to-side and from end to end of said tank and positioned above and substantially parallel to the tank bottom wall, said wire mesh having openings of a size to closely receive eggs individually therein, egg scrubbing means in said tank below said holding means comprising a flat plate extending longitudinally and transversely of said tank a distance below said wire mesh holding means to support eggs in the openings of the wire mesh and a fabric covering over the upper surface of said plate, said plate being longitudinally reciprocable in said tank, means supported on the bottom of said tank supporting said plate in position spaced from and substantially parallel to the tank bottom, and means carried by said tank and operatively connected to said plate to impart reciprocating movement to the latter.

2. Egg washing apparatus comprising a shallow, rectangular tank having an open upper side, egg holding means in said tank comprising a piece of wire mesh extending from side-to-side and from end to end of said tank and positioned above and substantially parallel to the tank bottom wall, said wire mesh having openings of a size to closely receive eggs individually therein, egg scrubbing means in said tank below said holding means comprising a flat plate extending longitudinally and transversely of said tank a distance below said wire mesh holding means to support eggs in the openings of the wire mesh and a fabric covering over the upper surface of said plate, said plate being longitudinally reciprocable in said tank, means supported on the bottom of said tank supporting said plate in position spaced from and substantially parallel to the tank bottom, and means carried by said tank and operatively connected to said plate to impart reciprocating movement to the latter, said means imparting reciprocating movement to said scrubber comprising a post secured to one end of said scrubber and extending upwardly therefrom, an electric motor mounted on said tank with its shaft extending above the upper edges of the tank walls, an axle carried by said tank, a gear journalled on the upper end of said axle, a gear on said motor shaft meshing with said first mentioned gear to rotate the same, an eccentric pin extending upwardly from said first mentioned gear, and a link rod pivotally connecting said eccentric pin with said post to reciprocately move said scrubber upon rotation of said first mentioned gear by said motor.

LOUIS J. BOWLER.

REFERENCES CITED

The following references are of record in the file of this patent:

UNITED STATES PATENTS

| Number | Name | Date |
|---|---|---|
| 901,774 | Boies | Oct. 20, 1908 |
| 1,131,158 | Peterson | Mar. 9, 1915 |
| 1,520,424 | McCullough | Dec. 23, 1924 |
| 1,542,347 | McCullough | June 16, 1925 |
| 1,639,487 | Collis | Aug. 16, 1927 |
| 1,963,139 | Mattoon | June 19, 1934 |
| 2,087,844 | Hansen | July 20, 1937 |
| 2,301,931 | Davis | Nov. 17, 1942 |
| 2,410,163 | Howard | Oct. 29, 1946 |